May 14, 1935.　　　G. W. GARMAN　　　2,001,530
ELECTRIC DISCHARGE DEVICE SYSTEM
Filed March 20, 1930

Inventor:
George W. Garman,
by Charles E. Tullar
His Attorney.

Patented May 14, 1935

2,001,530

UNITED STATES PATENT OFFICE 2,001,530

ELECTRIC DISCHARGE DEVICE SYSTEM

George W. Garman, Scotia, N. Y., assignor to General Electric Company, a corporation of New York Application March 20, 1930, Serial No. 437,627

6 Claims. (Cl. 250—27)

My invention relates to means for controlling the starting of current through electric discharge devices, wherein the transmission of current is effected both by electrons and by positive ions, and has for its principal object the provision of an improved arrangement and method of operation for controlling or varying the times at which current starts through such a device.

It is well known that the starting of current through a device including a cathode and anode immersed in a rarefied gas or vapor, such as mercury vapor at a pressure of a few microns, may be controlled by a grid and that such a grid is ineffective to interrupt the current after it is established. If an alternating potential is applied between the cathode and anode of the device, control by the grid is regained at the end of each half cycle. If a unidirectional potential is applied between the cathode and anode, some means must be provided for temporarily neutralizing the effect of this potential.

It has been proposed to control the instant of current starting by means of an alternating grid potential of the same frequency as that of the anode potential, the instant of starting in the half cycle of anode voltage being determined either by shifting the phase of the alternating grid potential or by varying the magnitude of a unidirectional grid bias potential. These methods of control, however, are not altogether satisfactory for the reason that they involve the provision of phase shifting devices or more or less complicated apparatus. In accordance with my invention, this difficulty is largely avoided by the provision of an improved and simplified means for controlling or regulating the grid potential of the device.

My invention will be better understood from the following description when considered in connection with the accompanying drawing, and its scope will be pointed out in the appended claims.

Figure 1:
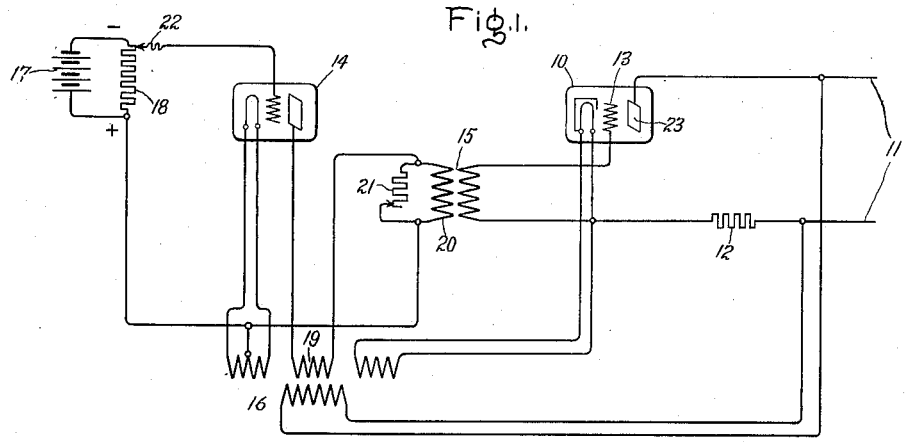
Figure 2:
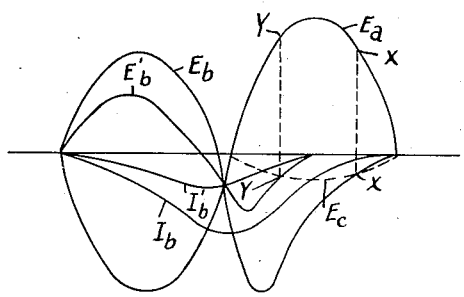
Figure 3:
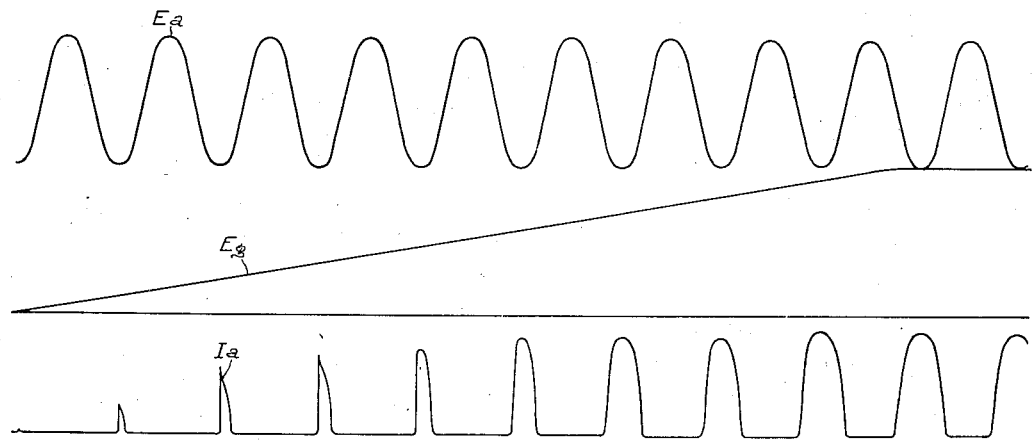

Referring to the drawing, Fig. 1 illustrates an arrangement wherein my invention has been embodied; and Figs. 2 and 3 are a group of curves which are copies of oscillograms made during the operation of the apparatus.

The apparatus includes an electric discharge device 10 through which current is supplied from an alternating current circuit 11 to a direct current load 12. Since the device 10 conducts current only in one direction, only current impulses corresponding to alternate half cycles are supplied to the load 12. It will be evident, however, that my invention is applicable to apparatus operable to rectify both half cycles of the alternating potential applied to the anode circuit or circuits of the electric discharge apparatus.

In either case, the part of the half cycle during which current is transmitted to the direct current load is determined by the grid potential or potentials of the electric discharge apparatus. Thus in the illustrated embodiment of the apparatus, current is supplied to the load 12 during a part of the half cycle determined by the potential of the grid 13.

The grid potential control means of the device 10 includes a space discharge device 14 and a transformer 15. As indicated by Fig. 1 of the drawing, a transformer 16 connected to the circuit 11 is provided with three secondary windings one of which is arranged to apply an alternating current to the plate circuit of the device 14 and the other two of which supply heating current respectively to the cathode of the device 14 and the device 10. A direct current potential source 17 and an impedance element or resistor 18 are connected in parallel with one another in the grid or input circuit of the device 14. The output or anode circuit of this device includes a secondary winding 19 of the transformer 16 and the primary winding 20 of the transformer 15, an impedance element such as a resistor 21 being connected in shunt to the winding 20.

The operation of the above described apparatus will be better understood by reference to Figs. 2 and 3 of the accompanying drawing. Referring more particularly to Fig. 2, the curve $E_a$ represents one cycle of alternating potential applied to the anode 23 of the device 10 and also to the circuit including the device 14 and the primary winding of the grid transformer 15. The curve $I_b$ represents the current flowing in this latter circuit. It will be noticed that during the negative half cycle of potential $E_a$ this curve follows substantially a sine wave with its zero axis and phase displaced. At the end of the first half cycle, however, the potential applied to the primary winding of the transformer 15 is interrupted due to the unilateral conductivity characteristics of the device 14. However, the primary winding 20 is shunted by a resistor 21 and the energy stored in the magnetic field of the transformer 15 is gradually dissipated in this resistor the current following the curve $I_b$ as illustrated in the figure. Grid transformer 15 is loaded for only a fraction of a cycle and has the characteristics of a reactor. The counter-electromotive force of the transformer 15 due to the current $I_b$, is represented by the curve $E_b$, which it is seen, is considerably distorted from a sine wave. The curve $E_c$ represents the grid control characteristic of the valve 10; that is, the grid potential of the device 10 must be made less negative for any given value of anode potential represented by the curve $E_a$ than the corresponding value of the curve $E_c$ in order for the valve 10 to conduct current. It will be noted that the curve $E_b$ intersects the curve $E_c$ at the point X so that the valve 10 will become conductive at this point in the half cycles of positive anode potential to pass load current to the device 12.

Similarly the curve $I'_b$ represents the current flowing in the circuit including the primary winding of the transformer 15 when the grid potential of the device 14 is increased negatively so as to increase its impedance. The curve $E'_b$ represents the potential of the grid transformer 15 under this condition. This curve intersects the curve $E_c$ at the point Y at which point the device 10 is made conductive to pass current to load device 12. Thus, it is seen that, by varying the grid potential of the device 14, the distorted potential produced by connecting an electric valve in series with the primary winding of the grid transformer is varied in magnitude to intersect the critical grid potential curve at any desired point and thus render the device 10 conductive for any desired portion of its respective positive half cycles of anode potential.

In Fig. 3, the anode voltage of the device 10 is indicated by the curve $E_a$, the anode current is indicated by the curve $I_a$, and the potential applied to the grid of the device 14 is indicated by the curve $E_g$. It will be noted that little or no current is transmitted to the direct current load circuit when a comparatively low negative voltage is applied to the grid of the device 14 and that the direct current of the load increases as the magnitude of this negative potential is increased.

Variation of the potential $E_g$ is effected by adjustment of the resistor 18. Thus when the adjustable terminal 22 is in its illustrated position, a comparatively large negative potential is applied to the input circuit of the device 14, the plate impedance of this device is increased, the alternating potential applied to the grid 13 is comparatively low, and maximum current flows through the device 10 for the reason that the negative potential of the grid 13 is decreased at the time that the corresponding anode 23 is positive.

If the negative grid potential of the device 14 be gradually decreased in magnitude, the magnitude and wave shape of the alternating potential applied to the grid 13 through the transformer 15 is changed and a gradual decrease in the current of the direct current load is produced as indicated by the curve $I_a$ of Fig. 3.

The change in grid bias potential of the device 14 required to vary the direct current of the load 12 from its minimum to its maximum value can readily be varied by change in the resistance of the resistor 21, change in the amplification ratio of the device 14, or change in the inductance of the transformer 15.

What I claim as new and desire to secure by Letters Patent of the United States is:

1. The combination of a vapor electric discharge device provided with a grid for controlling the starting of current between its cathode and anode, means for applying an alternating potential to said grid, a space discharge device arranged to vary the character of said potential, and means for controlling the current in said space discharge device including a potential source and a resistor connected in parallel with one another in the input circuit of said space discharge device.

2. The combination of a circuit including a vapor electric discharge device provided with a grid for controlling the current of said circuit, means including a transformer interposed between said circuit and said grid for controlling the potential of said grid, a source of alternating current, a space discharge device connected in series with said source of alternating current and a winding of said transformer to supply unidirectional current impulses thereto, and means for varying the impedance of said space discharge device, whereby the magnitude of the current in said circuit is varied between different values.

3. The combination of a vapor electric discharge device provided with a grid for controlling the starting of current between its cathode and anode, a source of alternating potential, a transformer having one winding interposed between said cathode and said grid, rectifying means included in circuit with the other winding of said transformer and said source of alternating potential for suppressing half cycles of said supply potential of predetermined polarity from said grid, impedance means connected in parallel to said transformer to provide a path for inductive transients, and means for varying the energization of said transformer to control the current carried by said discharge device.

4. The combination of a vapor electric discharge device provided with a grid for controlling the starting of current between its cathode and anode, a circuit for applying an alternating potential to said grid including a source of alternating current, and a space discharge device connected in series with one winding of a transformer, the other transformer winding being connected to said grid, and means for varying the impedance of said space discharge device variably to distort the wave form of said alternating potential.

5. The combination of a vapor discharge device including an anode, a cathode and a grid for controlling the starting of current between the cathode and anode, a grid circuit for said device, a space discharge device including a cathode, an anode and a grid, an output circuit therefor including an electromagnetic energy storage element coupled to said grid circuit, a transient by-pass circuit connected across said energy storage element, a source of alternating potential for supplying anode potential to said space discharge device, and means for selectively varying the impedance of said space discharge device to control the magnitude and wave form of the energy supplied by said electromagnetic storage element to the grid circuit of said vapor discharge device.

6. The combination of a vapor discharge device including an anode, a cathode and a grid for controlling the starting of current between said cathode and said anode, an electromagnetic energy storage element, a space discharge device having an anode circuit coupled to the grid circuit of said vapor discharge device through said energy storage element, a source of alternating potential for the anodes of both said devices, and means for selectively varying the impedance of said space discharge device to control the magnitude and wave form of the energy supplied by said energy storage element to said grid of said vapor discharge device whereby said latter device is rendered conductive for any selected portion of the positive half cycles of anode potential.

GEORGE W. GARMAN.